United States Patent
Tsutsumi et al.

(10) Patent No.: US 9,611,932 B2
(45) Date of Patent: Apr. 4, 2017

(54) CONTROL APPARATUS AND CONTROL METHOD FOR VEHICLE

(75) Inventors: Takahiko Tsutsumi, Toyota (JP); Ichiro Kitaori, Nagoya (JP); Koki Ueno, Toyota (JP); Keisuke Sekiya, Toyota (JP); Toshinari Suzuki, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 763 days.

(21) Appl. No.: 13/260,032

(22) PCT Filed: Jun. 3, 2009

(86) PCT No.: PCT/JP2009/060133
§ 371 (c)(1),
(2), (4) Date: Sep. 23, 2011

(87) PCT Pub. No.: WO2010/140229
PCT Pub. Date: Dec. 9, 2010

(65) Prior Publication Data
US 2012/0072083 A1    Mar. 22, 2012

(51) Int. Cl.
| | | |
|---|---|---|
| B60G 17/016 | (2006.01) | |
| B60G 17/0195 | (2006.01) | |
| F16H 61/32 | (2006.01) | |
| F16H 61/12 | (2010.01) | |
| F16H 57/01 | (2012.01) | |

(52) U.S. Cl.
CPC ............. *F16H 61/32* (2013.01); *F16H 61/12* (2013.01); *F16H 2057/016* (2013.01); *F16H 2061/326* (2013.01)

(58) Field of Classification Search
CPC ..................... B60G 17/0162; B60G 17/0195
See application file for complete search history.

(56) References Cited

U.S. PATENT DOCUMENTS

| | | | |
|---|---|---|---|
| 5,094,115 A | 3/1992 | Michihira et al. | |
| 5,305,240 A | 4/1994 | Davis et al. | |
| 5,919,112 A | 7/1999 | Michael et al. | |
| 2006/0103339 A1 | 5/2006 | Yamada et al. | |
| 2006/0108966 A1* | 5/2006 | Kamio et al. | 318/701 |
| 2006/0207373 A1* | 9/2006 | Amamiya et al. | 74/473.36 |
| 2009/0176619 A1 | 7/2009 | Inoue | |

FOREIGN PATENT DOCUMENTS

| | | |
|---|---|---|
| DE | 69100216 T2 | 11/1993 |
| DE | 19625019 A1 | 1/1998 |

(Continued)

*Primary Examiner* — Basil T Jos
(74) *Attorney, Agent, or Firm* — Sughrue Mion, PLLC

(57) ABSTRACT

When initial drive control for an actuator driving a shift switch mechanism is completed, a P-ECU determines whether an IG signal is received. In the case where the P-ECU has not received the IG signal at the time when the initial drive control is completed, the P-ECU temporarily keeps the actuator in a state where the initial drive control is completed. In the case where the P-ECU receives the IG signal in the period from completion of the initial drive control to the time when a predetermined time T2 has elapsed since completion of the initial drive control, the P-ECU executes P wall press control when the P-ECU receives the IG signal.

8 Claims, 13 Drawing Sheets

(56) References Cited

FOREIGN PATENT DOCUMENTS

| | | |
|---|---|---|
| DE | 102005052349 A1 | 6/2006 |
| DE | 602004008755 T2 | 6/2008 |
| DE | 112008000048 T5 | 9/2009 |
| GB | 2370325 A | 6/2002 |
| JP | 05-246266 A | 9/1993 |
| JP | 6-235458 A | 8/1994 |
| JP | 2002-188722 A | 7/2002 |
| JP | 2002-323127 A | 11/2002 |
| JP | 2004-308752 A | 11/2004 |
| JP | 2004-308848 A | 11/2004 |
| JP | 2005-042890 A | 2/2005 |
| JP | 2005-069406 A | 3/2005 |
| JP | 2006-336840 A | 12/2006 |
| JP | 2007-247724 A | 9/2007 |
| JP | 2008-286346 A | 11/2008 |
| JP | 2009-293706 A | 12/2009 |

\* cited by examiner

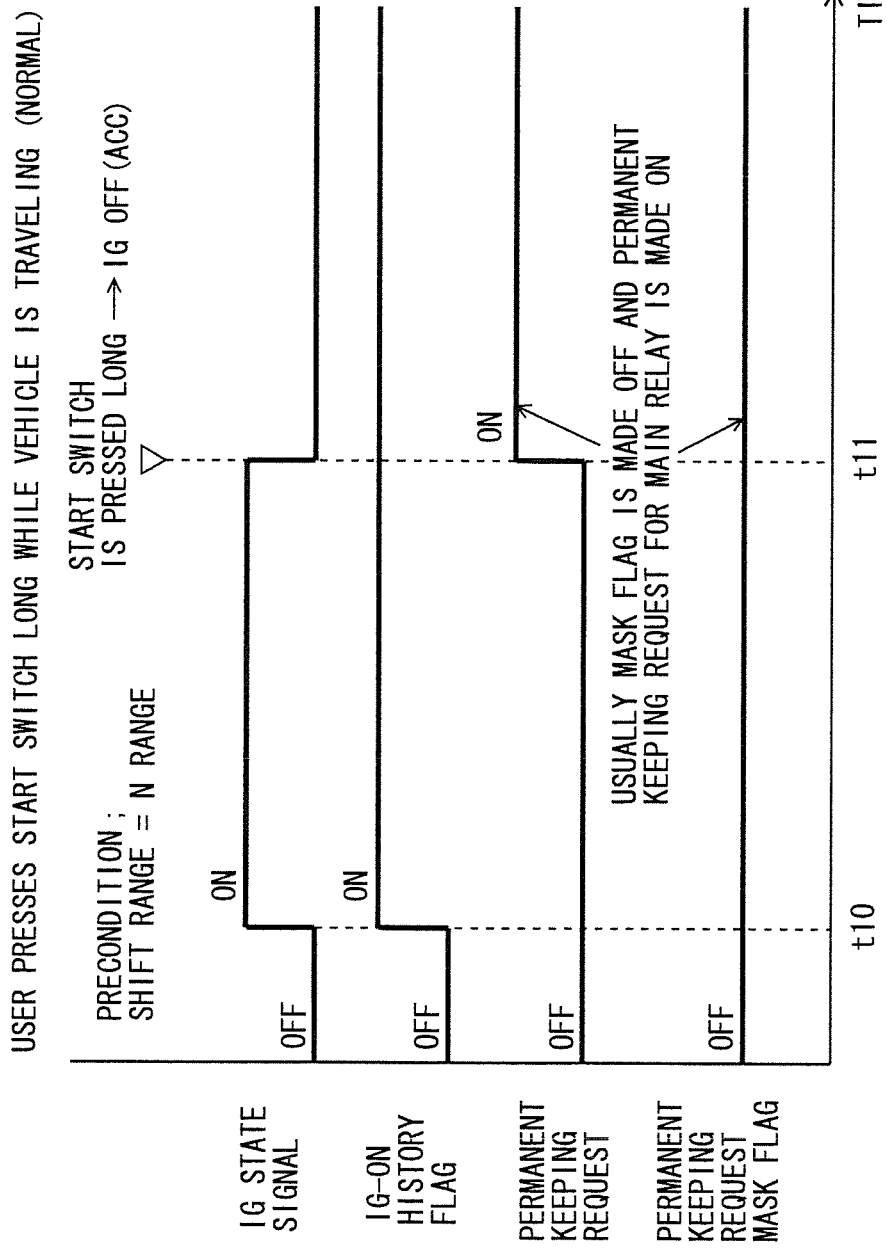

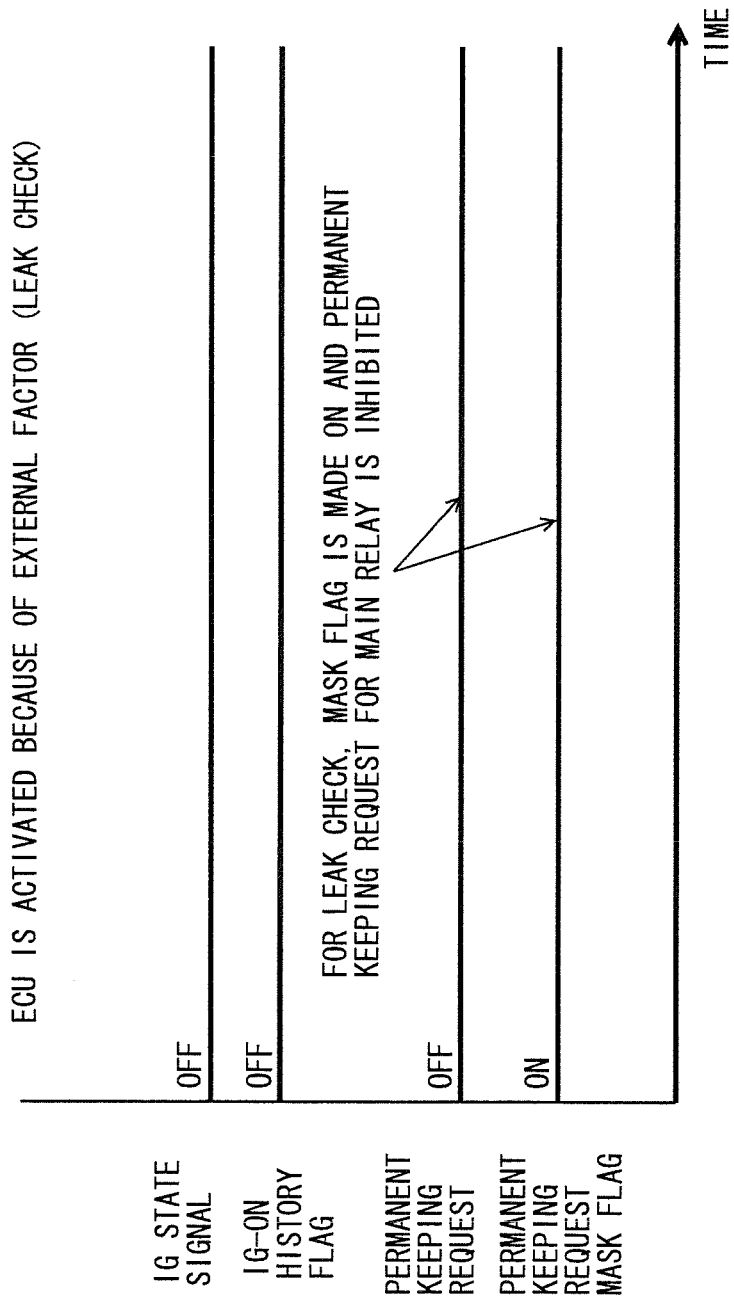

CONTROL APPARATUS AND CONTROL METHOD FOR VEHICLE

CROSS REFERENCE TO RELATED APPLICATIONS

This application is a National Stage of International Application No. PCT/JP2009/060133 filed Jun. 3, 2009, the contents of all of which are incorporated herein by reference in their entirety.

TECHNICAL FIELD

The present invention relates to control of a vehicle having a shift switch mechanism for switching the shift range of a transmission by driving an actuator.

BACKGROUND ART

A shift control system has been known that switches the shift range of an automatic transmission under electrical control in response to manipulation of a shift lever by a driver. Such a shift control system is disclosed in Japanese Patent Laying-Open No. 2004-308752 (Patent Document 1). The disclosed shift control system can appropriately control rotation of an actuator that drives a shift switch mechanism for switching the shift range of a transmission, using an encoder capable of detecting only the information about relative position.

The shift control system disclosed in Japanese Patent Laying-Open No. 2004-308752 performs control in such a manner that causes the actuator to rotate and thereby causes a wall of a detent plate to be pressed against a roller of a detent spring (hereinafter also referred to as "press control" or "wall press control"), and the position where the wall and the roller come into contact with each other is detected so as to detect the wall position of the detent plate. This wall position is used as a reference position. Therefore, the rotation of the actuator can be appropriately controlled even when the encoder capable of detecting only the information about relative position is used.

CITATION LIST

Patent Literature

PTL 1: Japanese Patent Laying-Open No. 2004-308752
PTL 2: Japanese Patent Laying-Open No. 2005-69406
PTL 3: Japanese Patent Laying-Open No. 2002-323127
PTL 4: Japanese Patent Laying-Open No. 2006-336840
PTL 5: Japanese Patent Laying-Open No. 2007-247724

SUMMARY OF INVENTION

Technical Problem

In recent years, for the purpose of OBD (On Board Diagnostics) for example, it has become necessary to check the vehicle state by activating an electronic control unit (hereinafter referred to as "ECU") used for controlling vehicle's electrical devices including an actuator or the like for driving a shift switch mechanism, not only in the case where a user has performed manipulation for starting the vehicle but also in the case where the user has performed no manipulation for starting the vehicle.

The above-referenced wall press control is conventionally performed each time the ECU is activated (each time the ECU is powered up). If the wall press control is performed each time the ECU is activated, the number of times the wall press control is performed increases, namely the wall of the detent plate and the roller of the detent spring are caused to come into contact with each other an increased number of times, which might lead to deterioration in durability of the components of the shift switch mechanism.

The present invention has been made to solve the above-described problem, and an object of the invention is to provide a control apparatus and a control method for a vehicle having a shift switch mechanism for switching the shift range of a transmission by driving an actuator, so that deterioration in durability of the components of the shift switch mechanism can be suppressed.

Solution to Problem

A control apparatus according to the present invention is a control apparatus for a vehicle having a shift switch mechanism for switching a shift range of a transmission by driving an actuator. The shift switch mechanism includes a rotational member coupled to the actuator, and a restriction member for restricting rotation in a predetermined direction of the rotational member by contacting a predetermined portion of the rotational member when a rotational position in the predetermined direction of the rotational member is caused to reach a reference position corresponding to a predetermined shift range by driving the actuator. The control apparatus includes a first device for detecting that a user of the vehicle performs a start manipulation for starting the vehicle, and a second device activated in response to detection of the start manipulation by the first device or in response to occurrence of a factor different from the start manipulation, for controlling driving of the actuator. The second device determines, when the second device is activated, whether activation of the second device is caused by the start manipulation or the factor different from the start manipulation, the second device controls the actuator so that press control is executed by rotating the rotational member in the predetermined direction to cause the predetermined portion of the rotational member to be pressed against the restriction member for detecting the reference position, when activation of the second device is caused by the start manipulation, and the second device controls the actuator so that the press control is not executed, when activation of the second device is caused by the factor different from the start manipulation.

Preferably, the actuator is required to undergo predetermined initial driving before driven by the press control. The second device executes initial control for performing the initial driving when the second device is activated, and determines after the initial control is completed whether activation of the second device is caused by the start manipulation or the factor different from the start manipulation.

More preferably, the control apparatus further includes a third device for transmitting to the second device start information that the start manipulation is detected by the first device. In a case where the second device receives the start information in a period from completion of the initial control to the time when a predetermined time has elapsed since completion of the initial control, the second device executes the press control based on a determination that activation of the second device is caused by the start manipulation and, in a case where the second device has not received the start information at the time when the predetermined time has elapsed since completion of the initial control, the second device does not execute the press control based on a determination that activation of the second device is caused by the factor different from the start manipulation.

More preferably, in a case where the second device has not received the start information at the time when the initial control is completed, the second device temporarily keeps the actuator in a state after the initial control, in a case where the second device does not receive the start information in the period from completion of the initial control to the time when the predetermined time has elapsed since completion of the initial control, the second device continues temporarily keeping the actuator in the state after the initial control, in a case where the second device receives the start information in the period from completion of the initial control to the time when the predetermined time has elapsed since completion of the initial control, the second device executes, when the second device receives the start information, the press control without executing again the initial control, and in a case where the second device has not received the start information at the time when the predetermined time has elapsed since completion of the initial control, the second device returns the actuator to a state before the initial control.

Still preferably, the control apparatus further includes a fourth device for making an abnormality determination of whether an abnormality occurs to the second device, based on a result of the press control by the second device. The fourth device does not make the abnormality determination when the second device cannot execute the press control based on the fact that activation of the second device is caused by the factor different from the start manipulation.

Still preferably, the vehicle includes a power supply for supplying electric power to the second device. The second device executes the press control to set the shift range to a parking range. The control apparatus further includes a fourth device for controlling supply of electric power from the power supply to the second device. In a case where the second device executes the press control based on the fact that activation of the second device is caused by the start manipulation, the fourth device inhibits stoppage of supply of electric power from the power supply to the second device when a predetermined condition including a condition that the shift range is a range different from the parking range is satisfied and, in a case where the second device cannot execute the press control based on the fact that activation of the second device is caused by the factor different from the start manipulation, the fourth device permits stoppage of supply of electric power from the power supply to the second device even when the predetermined condition is satisfied.

Still preferably, the vehicle is driven by at least an internal combustion engine. The factor different from the start manipulation includes necessity to diagnose an abnormality concerning the internal combustion engine while the second device is not activated.

A control method according to another aspect of the present invention is a control method for a vehicle having a shift switch mechanism for switching a shift range of a transmission by driving an actuator. The shift switch mechanism includes a rotational member coupled to the actuator, and a restriction member for restricting rotation in a predetermined direction of the rotational member by contacting a predetermined portion of the rotational member when a rotational position in the predetermined direction of the rotational member is caused to reach a reference position corresponding to a predetermined shift range by driving the actuator. The vehicle includes a first device for detecting that a user of the vehicle performs a start manipulation for starting the vehicle, and a second device activated in response to detection of the start manipulation by the first device or in response to occurrence of a factor different from the start manipulation, for controlling driving of the actuator. The control method is performed by the second device. The control method includes the steps of determining, when the second device is activated, whether activation of the second device is caused by the start manipulation or the factor different from the start manipulation, controlling the actuator so that press control is executed by causing the predetermined portion of the rotational member to be pressed against the restriction member for detecting the reference position, when activation of the second device is caused by the start manipulation, and controlling the actuator so that the press control is not executed, when activation of the second device is caused by the factor different from the start manipulation.

Advantageous Effects of Invention

According to the present invention, the second device for controlling driving of the actuator executes the press control in the case where activation of the second device is caused by the start manipulation by a user for starting the vehicle. In the case, however, where activation of the second device is caused by a factor different from the start manipulation, the second device does not perform the press control. Thus, as compared with the case where the press control is performed each time the second device is activated, the number of times the press control is executed can be reduced so that deterioration in durability of the components of the shift switch mechanism can be suppressed.

BRIEF DESCRIPTION OF DRAWINGS

FIG. 13 is a (first) diagram illustrating a permanent keeping mask flag for a main relay.
FIG. 14 is a (second) diagram illustrating a permanent keeping mask flag for the main relay.

DESCRIPTION OF EMBODIMENTS

Figure 1:
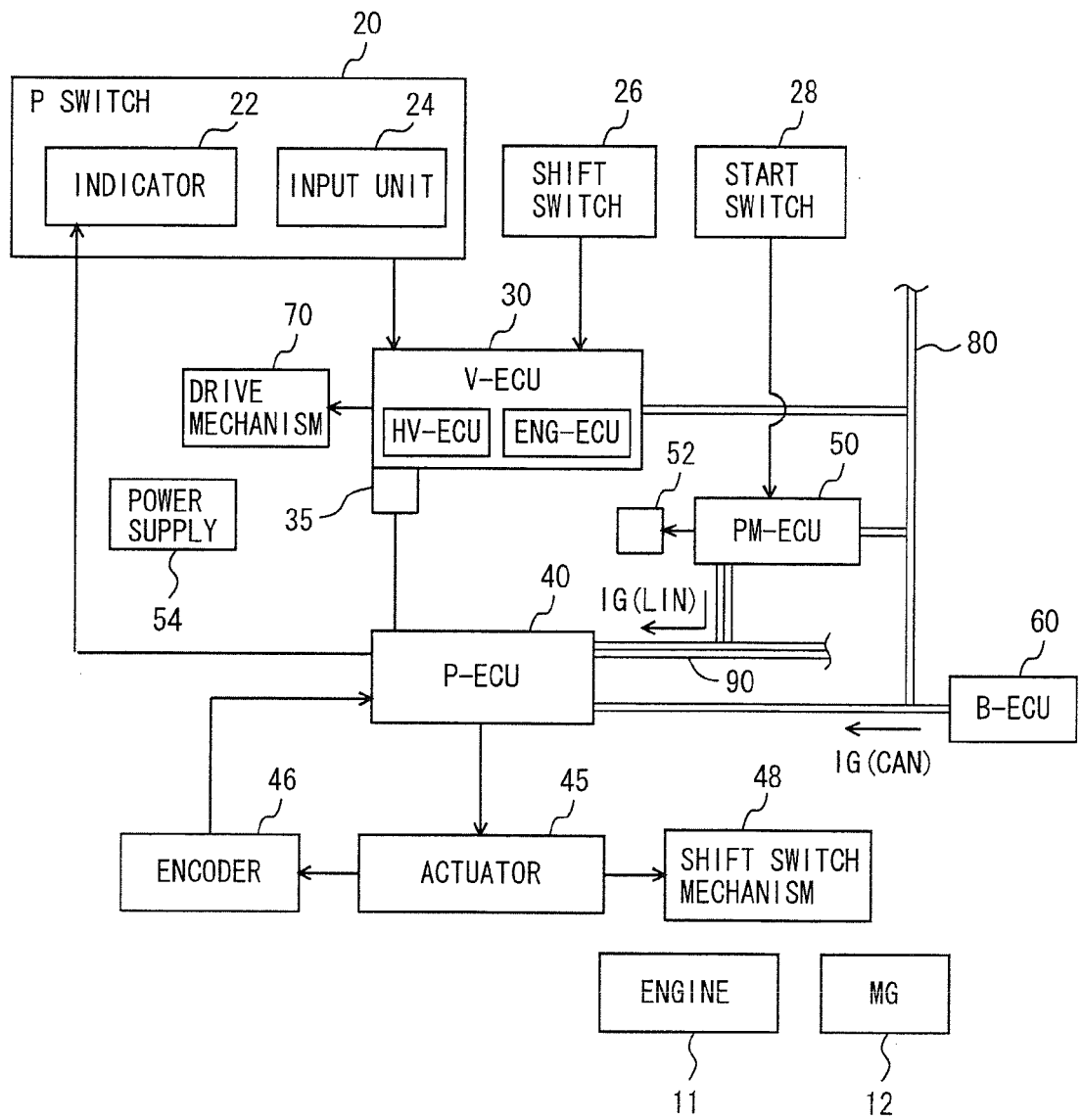
FIG. 1 shows a configuration of a vehicle.

Embodiments of the present invention will be described hereinafter with reference to the drawings. In the following description, like components are denoted by like reference characters. These components also have like names and like functions. Therefore, a detailed description of them will not be repeated.

First Embodiment

FIG. 1 shows a configuration of a vehicle 10 including a control apparatus of the present embodiment. Vehicle 10 of the present embodiment is a hybrid vehicle using an engine 11 and a motor generator (MG) 12 as drive sources. More than one MG 12 may be provided. Vehicles to which the present invention is applicable are not particularly limited to the hybrid vehicle. For example, the present invention is applicable to vehicles such as a vehicle using an engine as a drive source, an electrically-powered vehicle using a motor generator as a drive source, or a fuel cell vehicle.

Vehicle 10 includes, in addition to engine 11 and motor generator (MG) 12 used as drive sources, a shift control system for switching the shift range of a drive mechanism 70 configured as a continuously variable transmission mechanism. The shift control system functions as a shift-by-wire system for switching the shift range under electrical control. The shift control system includes a P switch 20, a shift switch 26, a start switch 28, a vehicle controller (hereinafter also referred to as "V-ECU") 30, a parking controller (hereinafter also referred to as "P-ECU") 40, a power management controller (hereinafter also referred to as "PM-ECU") 50, a body controller (hereinafter also referred to as "B-ECU") 60, drive mechanism 70, an actuator 45, an encoder 46, and a shift switch mechanism 48. Actuator 45 is driven to operate shift switch mechanism 48 and thereby switch the shift range.

P switch 20 is used for switching the shift range from a parking range (hereinafter also referred to as "P range") to any range other than the parking range (hereinafter also referred to as "non-P range") and vice versa. P switch 20 includes an indicator 22 for informing a driver of the state of the switch and an input unit 24 for receiving an instruction from a user such as driver. The driver enters through input unit 24 an instruction to change the shift range to the P range. Input unit 24 may be a momentary switch. The instruction from the driver that is received by input unit 24 is transmitted to V-ECU 30 and to P-ECU 40 via V-ECU 30.

Shift switch 26 is used for switching the shift range to a drive range (D), a reverse range (R), a neutral range (N), or a brake range (B) for example, or canceling the P range while the shift range is the P range. A user's instruction received by shift switch 26 is transmitted to V-ECU 30. Following the instruction from the driver, V-ECU 30 performs control for switching the shift range with drive mechanism 70. Although drive mechanism 70 is configured as a continuously variable transmission mechanism, it may be configured as a transmission changing gears in stepwise manner.

V-ECU 30 generally manages the operation of vehicle 10, based on information from P switch 20 and shift switch 26, as well as an accelerator pedal position sensor and brake depression force sensor (not shown), for example. V-ECU 30 includes as its components an engine controller (ENG-ECU) chiefly for controlling the system of engine 11, and a hybrid controller (HV-ECU) for controlling the whole hybrid system.

V-ECU 30 is connected by a CAN (Controller Area Network) communication line 80 to P-ECU 40, PM-ECU 50 and B-ECU 60, and communicates with each controller as required through CAN communication line 80. To V-ECU 30, an IG state signal indicating whether the state of an IG relay 52 (described later) is actually ON or not is input.

P-ECU 40 controls the operation of actuator 45 that drives shift switch mechanism 48, in order to switch the shift range between the P range and the non-P range. When a user presses input unit 24 while the shift range is the non-P range, P-ECU 40 controls the operation of actuator 45 so that the shift range is switched to the P range.

Actuator 45 is configured as a switched reluctance motor (hereinafter also referred to as "SR motor"). In response to an instruction from P-ECU 40, actuator 45 drives shift switch mechanism 48. Encoder 46 rotates together with actuator 45 to detect the amount of rotation (rotational speed) of the SR motor. Encoder 46 of the present embodiment is a rotary encoder that outputs A phase, B phase and Z phase signals.

P-ECU 40 receives a signal output from encoder 46 to recognize the rotational status of the SR motor, and controls energization for driving the SR motor. In an initial stage where driving of actuator 45 is started, initial driving of actuator 45 is necessary for adjusting the initial phase of actuator 45. Therefore, once P-ECU 40 is activated, P-ECU 40 first executes control for performing initial driving of actuator 45 (hereinafter also referred to as "initial drive control"). After the initial drive control is completed, P-ECU 40 starts normal control or wall press control (described later) for actuator 45.

Start switch 28 is manipulated by a user to turn on or turn off a plurality of electrical devices that constitute the whole hybrid system of vehicle 10. Start switch 28 is an ignition (IG) switch for example. Once start switch 28 detects that a user performs manipulation for starting vehicle 10 (hereinafter also referred to as "IG ON manipulation"), start switch 28 transmits to PM-ECU 50 information that the IG ON manipulation is performed.

PM-ECU 50 turns on and off a plurality of electrical devices mounted on vehicle 10. Once PM-ECU 50 receives information that the IG ON manipulation is performed from start switch 28, PM-ECU 50 transmits to IG relay 52 an IG ON instruction signal for turning on IG relay 52.

A plurality of electrical devices that constitute the hybrid system, including controllers such as V-ECU 30, P-ECU 40 and B-ECU 60 are connected to a power supply 54 such as battery via IG relay 52. Therefore, when IG relay 52 is turned on, electric power is supplied to each controller. Each controller is then activated so that vehicle 10 is ready to travel (READY-ON state). The electric power supplied to actuator 45 is controlled by P-ECU 40 after P-ECU 40 is activated.

V-ECU 30 and P-ECU 40 are connected to power supply 54 also via main relay 35. Therefore, when main relay 35 is turned on as well, V-ECU 30 and P-ECU 40 are activated. Turn-on and turn-off of main relay 35 are controlled by V-ECU 30. Turn-on and turn-off of main relay 35 may be controlled by PM-ECU 50, or controlled by both of V-ECU 30 and PM-ECU 50.

PM-ECU 50 is connected to P-ECU 40 by a LIN (Local Interconnect Network) communication line 90, and communicates with P-ECU 40 as required via LIN communication line 90. When PM-ECU 50 transmits the IG ON instruction signal to IG relay 52, PM-ECU 50 transmits to P-ECU 40 an IG (LIN) signal representing the fact that the IG ON instruction signal is transmitted to IG relay 52.

B-ECU 60 transmits a signal representing the state of the body of vehicle 10 (such as PKB signal representing the state of the parking brake) to each controller through CAN communication line 80. To B-ECU 60, the IG state signal indicating whether the state of IG relay 52 is actually ON or not is input. When the IG state signal represents the fact that the state of IG relay 52 is ON, B-ECU 60 transmits the IG (CAN) signal through CAN communication line 80 to P-ECU 40.

Activation of V-ECU 30 and P-ECU 40 will now be described. In the present embodiment, activation of V-ECU 30 and P-ECU 40 is chiefly classified into the following two types.

A first type of activation is normal activation in response to user's IG ON manipulation. Namely, as the user performs the IG ON manipulation while the IG relay is OFF, PM-ECU 50 turns on IG relay 52. Accordingly, electric power is supplied from power supply 54 to V-ECU 30 and P-ECU 40, so that V-ECU 30 and P-ECU 40 are activated.

A second type of activation is based on a factor that is not based on the IG ON manipulation of a user (hereinafter also referred to "external factor"). In the present embodiment, V-ECU 30 (more specifically the ENG-ECU included in V-ECU 30) conducts diagnosis at a predetermined frequency (five times per day for example) after the IG relay is turned off for detecting whether fuel leaks from a fuel tank of engine 11 (hereinafter also referred to as "leak check"). The leak check is an example of the above-referenced external factor.

In other words, V-ECU 30 turns on main relay 35 at a predetermined frequency for the purpose of the leak check so as to activate V-ECU 30 itself, even after the IG relay is turned off. When the leak check is to be conducted, PM-ECU 50 may turn on main relay 35 to activate V-ECU 30. Main relay 35 is thus turned on when the leak check is to be conducted, and accordingly P-ECU 40 is activated. After the leak check is completed, V-ECU 30 turns on main relay 35 to stop V-ECU 30 itself. Accordingly, P-ECU 40 is also stopped.

Figure 2:
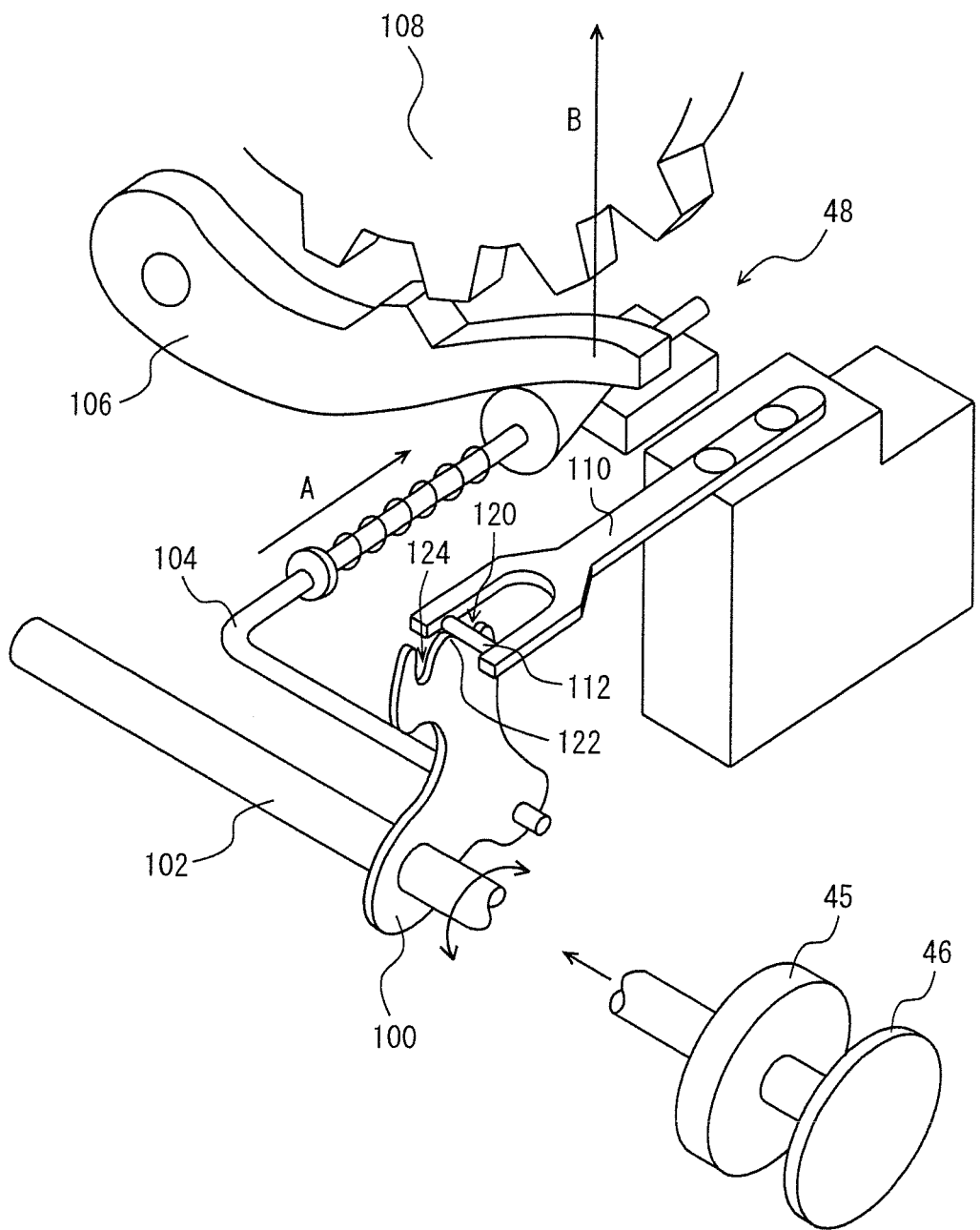
FIG. 2 shows a configuration of a shift switch mechanism.

Referring to FIG. 2, shift switch mechanism 48 will be described. FIG. 2 shows a configuration of shift switch mechanism 48. In the following description, the shift range refers to the P range or non-P range and does not include the R, N, D and B ranges of the non-P range.

Shift switch mechanism 48 includes a detent plate 100 coupled to actuator 45 via a shaft 102 and rotated as actuator 45 rotates, a rod 104 operated as detent plate 100 rotates, a parking gear 108 fixed to an output shaft of a transmission (not shown), a parking lock pole 106 for locking parking gear 108, and a detent spring 110 and a roller 112 restricting the rotation of detent plate 100 within a predetermined extent so as to fix the shift range.

Detent plate 100 is driven by actuator 45 to switch the shift range. Shaft 102, detent plate 100, rod 104, detent spring 110, and roller 112 function as the shift switch mechanism.

Encoder 46 detects the amount of rotation of actuator 45, namely the relative position of actuator 45.

FIG. 2 shows a state where the shift range is the non-P range. In this state, parking lock pole 106 does not lock parking gear 108, and thus rotation of the drive shaft of the vehicle is not hindered. As actuator 45 in this state causes shaft 102 to rotate clockwise, rod 104 is pushed via detent plate 100 in the direction of arrow A shown in FIG. 2, and accordingly a tapered portion provided at an end of rod 104 pushes up parking lock pole 106 in the direction of arrow B shown in FIG. 2. As detent plate 100 rotates clockwise, roller 112 of detent spring 110 having been located at a non-P range position 120, which is one of the two depressions provided at the head of detent plate 100, proceeds over a crest 122 to reach a P range position 124 which is the other depression. Roller 112 is provided at detent spring 110 in such a manner that the roller is rotatable in its axial direction. When detent plate 100 rotates to the extent that allows roller 112 to reach P range position 124, parking lock pole 106 has been pushed up to the position where the parking lock pole engages with parking gear 108. In this way, the drive shaft of the vehicle is mechanically fixed and the shift range is switched to the P range.

Figure 3:
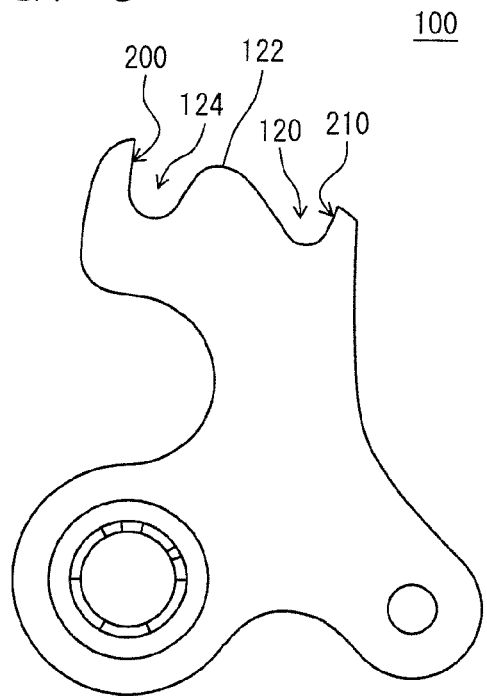
FIG. 3 shows a configuration of a detent plate.

FIG. 3 shows a configuration of detent plate 100. As shown in FIG. 3, at P range position 124 and non-P range position 120 respectively, the surface sections located away from crest 122 are a P wall 200 and a non-P wall 210, respectively. The rotation of detent plate 100 (namely the rotation of actuator 45) is restricted when these P wall 200 and non-P wall 210 are caused to come into contact with roller 112.

Figure 4:
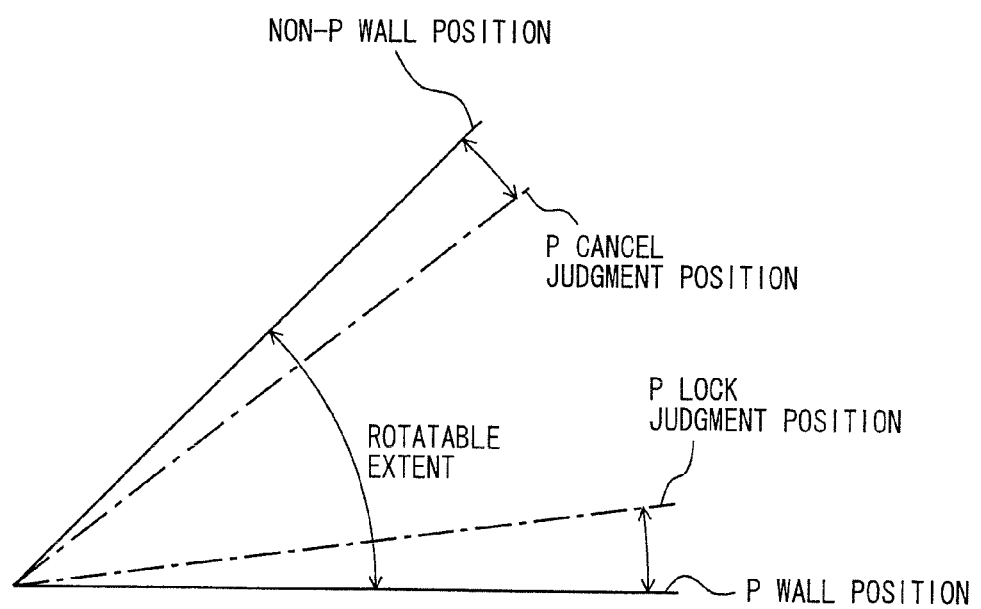
FIG. 4 illustrates a control method for an actuator.

FIG. 4 illustrates a P range confirmation process performed by P-ECU 40. The P range confirmation process refers to a process of actually detecting that the shift range is the P range. In FIG. 4, the position of P wall 200 is conceptually shown where P-ECU 40 performs the P range confirmation process. The extent from the P wall position to the non-P wall position shown in FIG. 4 corresponds to the extent to which actuator 45 can rotate.

P-ECU 40 sets a P lock judgment position at a position separated by a predetermined extent from the P wall position. When a relative position of actuator 45 with respect to the P wall position is located between the P wall position and the P lock judgment position, P-ECU 40 confirms that the shift range is the P range.

As seen from above, the P wall position is a reference position used for actually detecting that the shift range is the P range through the P range confirmation process. In order to confirm that the shift range is the P range by the P range confirmation process, it is necessary that the P wall position has been detected. Encoder 46, however, cannot detect the absolute position of actuator 45, although encoder 46 is capable of detecting a relative position of actuator 45.

P-ECU 40 thus performs control in such a manner that actuator 45 is rotated to cause P wall 200 to be pressed against roller 112 (hereinafter also referred to as "P wall press control"), and a relative position of actuator 45 detected by encoder 46 when the P wall press control is performed is used to detect the P wall position. Execution of the P wall press control sets the shift range to the P range.

Figure 5:
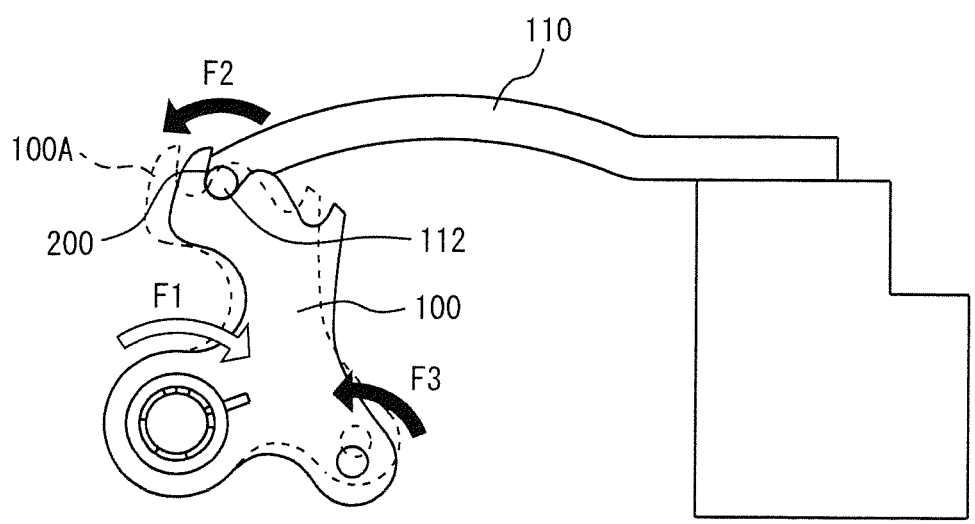
FIG. 5 illustrates a control method for detecting a P wall position.

FIG. 5 illustrates the P wall press control performed for detecting the P wall position. First, P-ECU 40 causes actuator 45 to rotate detent plate 100 clockwise, namely rotate in the direction where P wall 200 proceeds toward roller 112 of detent spring 110, so as to cause P wall 200 to come into contact with roller 112. Roller 112 at the P range position restricts the clockwise rotation of actuator 45. In FIG. 5, arrow F1 represents a rotational force of actuator 45, arrow F2 represents a spring force of detent spring 110 and arrow F3 represents a counteractive force of rod 104. Detent plate 100A outlined by the dotted line represents the position where P wall 200 and roller 112 contact each other. Thus, detection of the position of detent plate 100 corresponds to the detection of the P wall position.

After P wall 200 and roller 112 contact each other, rotational force F1 of actuator 45 still causes detent plate 100 to rotate clockwise from the position indicated by the dotted line, against the spring force of detent spring 110. Detent spring 110 accordingly flexes to increase spring force F2 and also increase counteractive force F3 of rod 104. When rotational force F1 becomes balanced with spring force F2 and counteractive force F3, the rotation of detent plate 100 is stopped.

Whether or not the rotation of detent plate 100 is stopped is determined based on a value (relative position of actuator 45) detected by encoder 46. Specifically, when the value detected by encoder 46 remains the same for a predetermined time, it is determined that respective rotations of detent plate 100 and actuator 45 are stopped.

P-ECU 40 detects the position of detent plate 100 whose rotation is stopped, as a provisional position of the P wall (hereinafter also referred to as "provisional P wall position"), and calculates the amount of flexure or angle of flexure of detent spring 110. The flexure amount or flexure angle is calculated by means of a map held in advance by P-ECU 40 and showing a relation of a flexure amount or flexure angle with a voltage applied to actuator 45. From this map, P-ECU 40 calculates a flexure amount or flexure angle corresponding to a voltage applied to actuator 45 when the provisional P wall position is detected. P-ECU 40 uses this map to correct the provisional P wall position based on the calculated flexure amount or flexure angle, and accordingly confirms that the corrected position is the P wall position. The P lock confirmation process can be accomplished by confirming the P wall position. Here, the way to calculate the flexure amount or flexure angle of detent spring 110 is not limited to the use of the map as described above.

In this way, actuator 45 is rotated to cause P wall 200 of detent plate 100 and roller 112 of detent spring 110 to come into contact with each other. The position of contact is detected to detect the P wall position. The P wall position is used as a reference position, so that the rotational position of actuator 45 can be appropriately recognized even when encoder 46 capable of only detecting information about relative position is used. Thus, the fact that the shift range is the P range can be actually detected.

The way to detect the non-P position is similar to the way to detect the P wall position. The detailed description is therefore not repeated.

As described above, in order to perform the P range confirmation process, it is necessary to detect the P wall position by the P wall press control in advance. In the case where the shift range is switched several tens of thousands of times, detent plate 100 and/or roller 112 will change with time due to wear and/or deformation. Therefore, the detection of the P wall position by the P wall press control is desirably performed for every trip (every time P-ECU 40 is activated).

In the present embodiment, however, P-ECU 40 is activated not only because of the IG ON manipulation performed by a user but also because of an external factor such as leak check after the IG relay is turned off, as described above. Therefore, if the P wall press control is performed each time P-ECU 40 is activated, the P wall press control is performed, namely P wall 200 is caused to be pressed against roller 112 an increased number of times, resulting in a possibility of deterioration in durability of the components of shift switch mechanism 48.

Therefore, in the present embodiment, P-ECU 40 determines, after P-ECU 40 is activated, whether P-ECU 40 itself is activated because of the IG ON manipulation or because of an external factor. In the case where P-ECU 40 is activated in response to the IG ON manipulation, the P wall press control is performed, while the P wall press control is not performed in the case where P-ECU 40 is activated because of the external factor. This is a most characteristic feature of the present invention.

Figure 6:
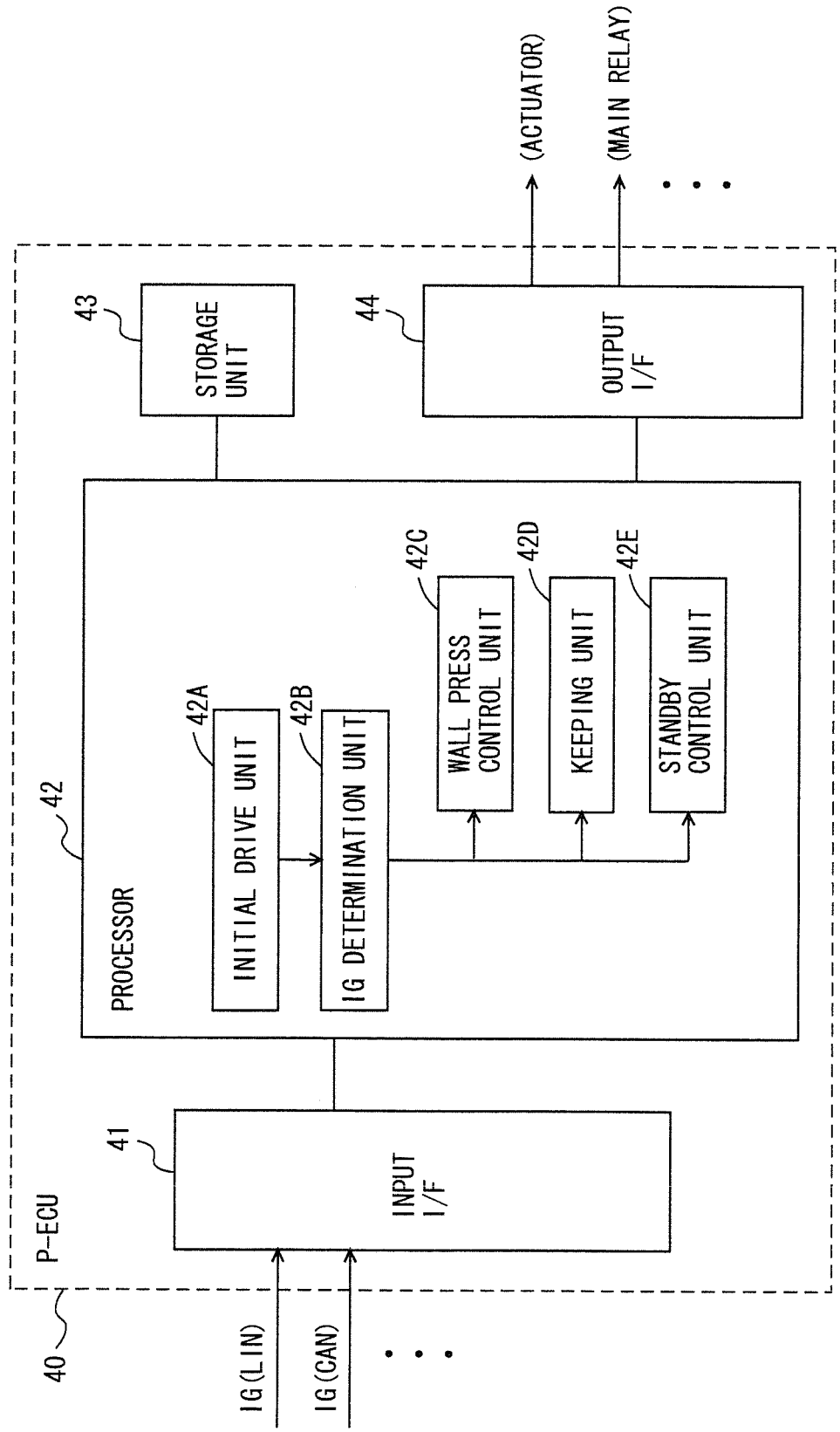
FIG. 6 is a functional block diagram of a P-ECU.

FIG. 6 shows a functional block diagram of P-ECU 40. P-ECU 40 includes an input interface 41, a processor 42, a storage unit 43, and an output interface 44.

To input interface 41, information is input from each sensor and each ECU, such as IG (LIN) signal from PM-ECU 50, IG (CAN) signal from B-ECU 60, the amount of rotation of actuator 45 from encoder 46, for example.

Storage unit 43 stores various types of information, program, threshold, and map, for example. Data in storage unit 43 is read into processor 42, or data from processor 42 is stored in storage unit 43, as required.

Processor 42 performs an operation based on information from input interface 41 and storage unit 43. The result of the operation by processor 42 is output to each device via output interface 44.

Processor 42 sets the control mode of actuator 45 to any of an initial standby mode, an initial drive mode, a wall press control mode, and a normal mode, and controls actuator 45 under the set control mode. The initial standby mode refers to a mode in which energization of actuator 45 is stopped and actuator 45 is rendered standby. The initial drive mode refers to a mode in which energization of actuator 45 is started and initial driving of actuator 45 is performed. After the initial driving is completed, the mode can be changed to the wall press control or normal control mode. In the wall press control mode, the wall press control is performed for detecting the P wall position. The normal mode refers to a mode in which the shift range is switched between the P range and the non-P range in response to manipulation of P switch 20 or shift switch 26 by a user.

Processor 42 includes an initial drive unit 42A, an IG determination unit 42B, a wall press control unit 42C, a keeping control unit 42D, and a standby control unit 42E.

When P-ECU 40 is activated (when electric power is supplied from power supply 54 to P-ECU 40), initial drive unit 42A performs the initial drive control. Specifically, initial drive unit 42A causes energization of actuator 45 to be started when P-ECU 40 is activated, and performs initial driving of actuator 45 until predetermined time T1 has elapsed from the start of energization. Predetermined time T1 is stored in advance in storage unit 43 as a period of time necessary for completion of the initial drive.

IG determination unit 42B determines whether P-ECU 40 is activated in response to the IG ON manipulation by a user or the activation is caused by an external factor. Specifically, IG determination unit 42B determines whether at least one of IG signals, namely IG (LIN) signal and IG (CAN) signal is received. The determination as to whether the IG signal is received or not is done in a period from the completion of the initial drive control to the time when predetermined time T2 has elapsed, until it is determined that the IG signal is received. In the case where it has not been determined that the IG signal is received, at the time when predetermined time T2 has elapsed, the determination is stopped when predetermined time T2 has elapsed. Predetermined time T2 is set in advance in consideration of communication delay of the IG (LIN) signal or IN (CAN) signal, and stored in storage unit 43.

Wall press control unit 42C determines that, when the IG signal is received before predetermined time T2 has elapsed from the completion of the initial drive control, P-ECU 40 is activated in response to the IG ON manipulation, and performs the wall press control when the IG signal is received. After the P wall press control is completed, the mode is changed to the normal mode.

Keeping control unit 42D temporarily keeps actuator 45 in a state where the initial drive control is completed, when the IG signal has not been received when the initial drive control is completed. Keeping control unit 42D continues the operation of temporarily keeping actuator 45 in the state where the initial drive control is completed, until the IG signal is received, from the completion of the initial drive control to the time when predetermined time T2 has elapsed.

Standby control unit 42E performs the initial standby control in the case where the IG signal has not been received even when predetermined time T2 has elapsed from completion of the initial drive control. Specifically, standby control unit 42E stops energization of actuator 45 and causes the actuator to return to the initial standby state before the initial drive control.

The above-described functions each may be implemented by software or hardware.

Figure 7:
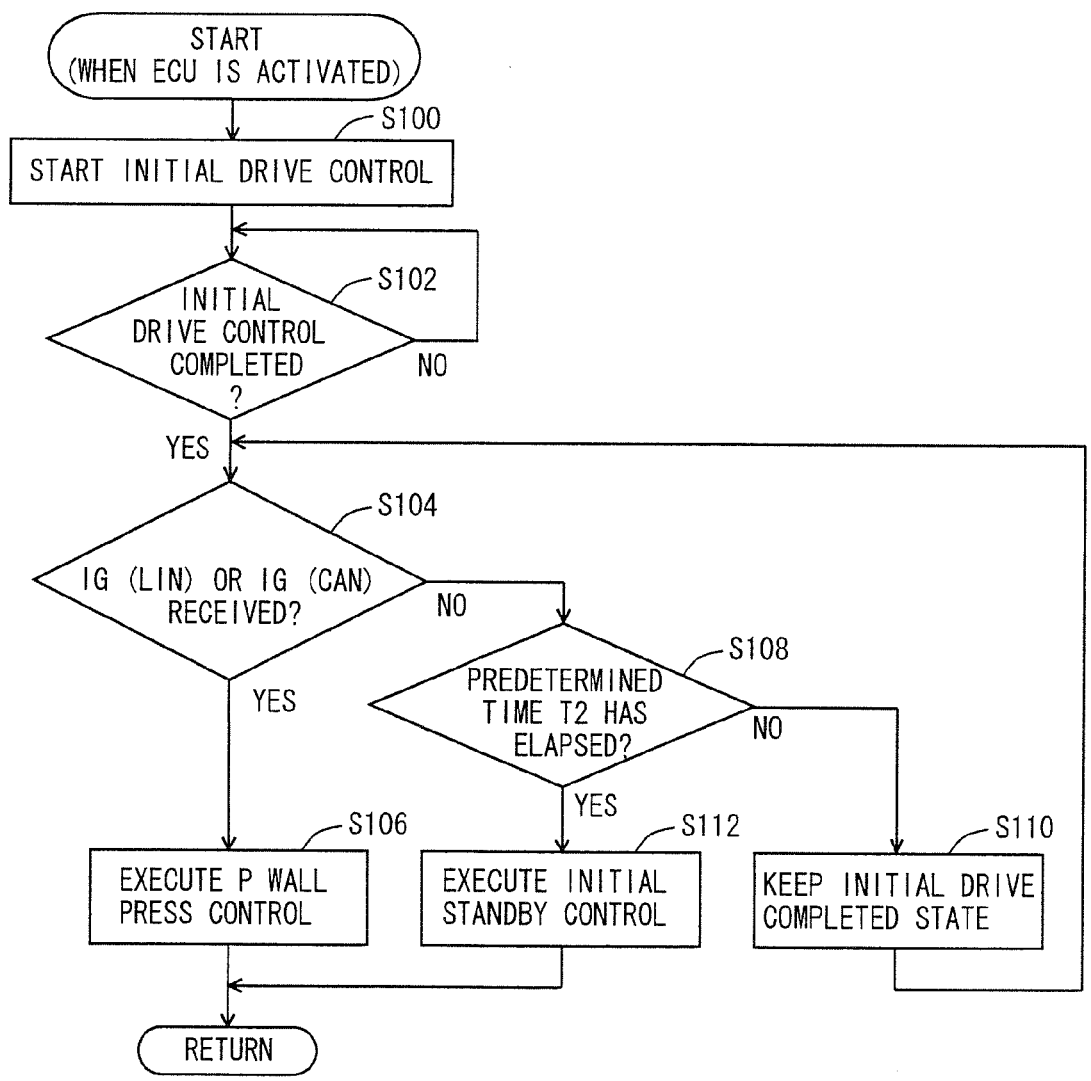
FIG. 7 is a process flowchart for the P-ECU.

FIG. 7 is a process flowchart for P-ECU 40 in the case where the above-described functions are implemented by software. The process is executed when P-ECU 40 is activated.

As shown in FIG. 7, in step (hereinafter step is abbreviated as S) 100, P-ECU 40 starts the above-described initial drive control.

In S102, P-ECU 40 determines whether the initial drive control is completed. The determination is made based on whether or not predetermined time T1 has elapsed from the start of the initial drive control. When the determination is positive (YES in S102), the process proceeds to S104. Otherwise (NO in S102), the process returns to S102 and this step is repeated until predetermined time T1 has elapsed. In response to the elapse of predetermined time T1 from the start of the initial drive control, an initial drive completion flag (flag representing the fact that the initial driving is completed) is made ON.

In S104, P-ECU 40 determines whether at least one of the IG signals, namely IG (LIN) signal and IG (CON) signal is received or not. If the determination is positive in this step (YES in S104), the process proceeds to S106. Otherwise (NO in S104), the process proceeds to S108. In the case where none of the IG (LIN) signal and IG (CON) signal has been received when the initial drive is completed, a timer for counting predetermined time T2 from the time when the initial drive is completed is started.

In S106, P-ECU 40 performs the above-described P wall press control. After the P wall press control is completed, the mode is changed to the normal mode.

In S108, P-ECU 40 determines whether or not predetermined time T2 has elapsed from the time when the initial drive control is completed. When the determination in this step is positive (YES in S108), the process proceeds to S112. Otherwise (NO in S108), the process proceeds to S110.

In S110, P-ECU 40 temporarily keeps actuator 45 in the state where the initial drive control is completed. After this, the process returns to S104.

In S112, P-ECU 40 executes the above-described initial standby control. As the initial standby control is started, the initial drive completion flag is made OFF while an initial drive transition inhibition flag (flag representing inhibition of transition to the initial drive mode) is made ON.

The operation of P-ECU 40 based on the above-described structure and flowchart will be described with reference to FIGS. 8 to 10.

Figure 8:
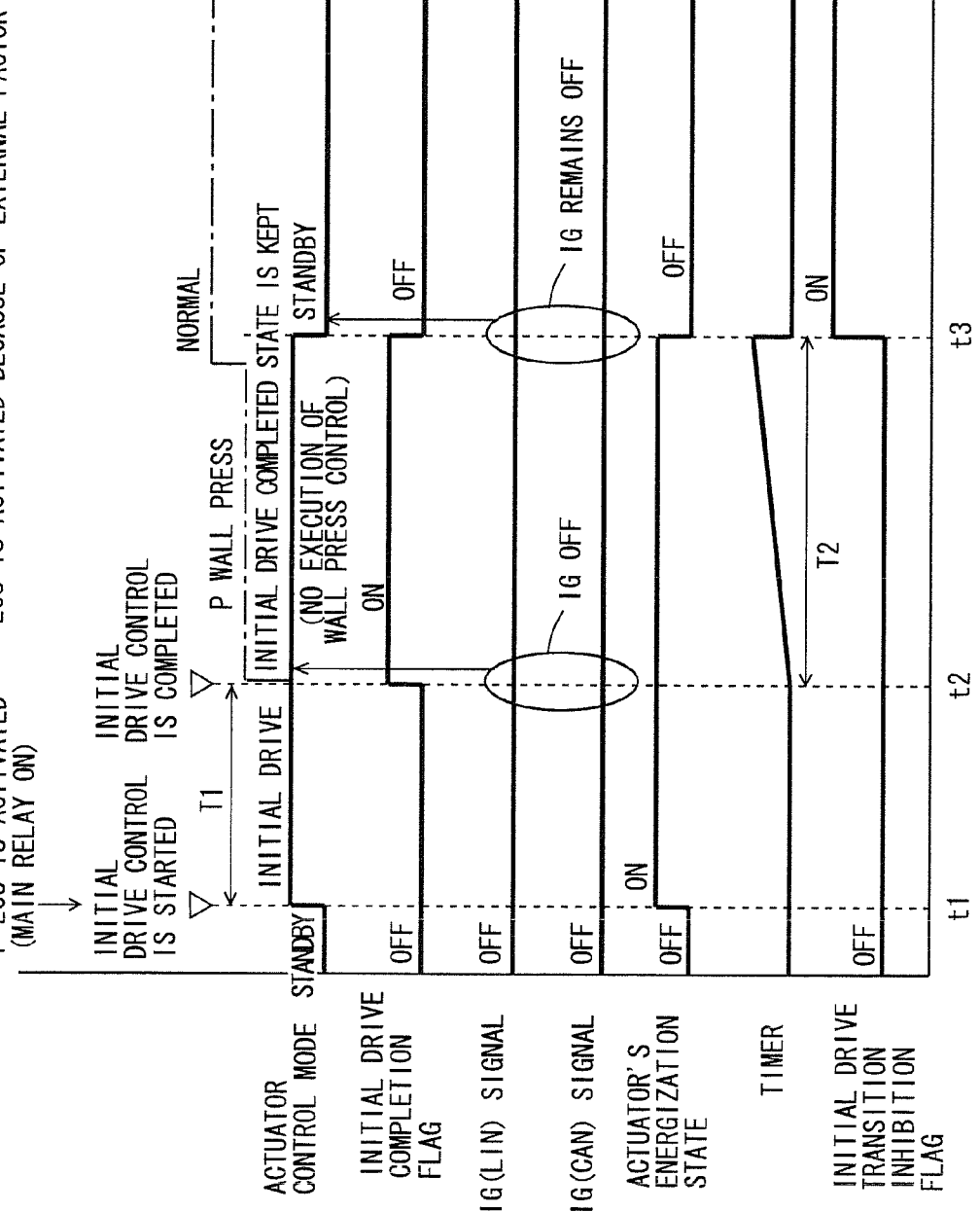
FIG. 8 is a (first) diagram illustrating a change with time of an actuator control mode in the case where P-ECU 40 is activated.

FIG. 8 shows a change with time of the actuator control mode in the case where activation of P-ECU 40 is caused by an external factor.

At time t1, V-ECU 30 turns on main relay 35 for the leak check, and accordingly P-ECU 40 is activated. Once P-ECU 40 is activated, P-ECU 40 starts energization of actuator 45, and performs initial driving of actuator 45 until time t2 when predetermined time T1 has elapsed. At time t2, the initial drive control is completed and the initial drive completion flag is made ON.

Conventionally, the P wall press control is started at time t2 when the initial drive control is completed, regardless of what causes activation of P-ECU 40, as indicated by the chain line.

In contrast, P-ECU 40 of the present embodiment determines that P-ECU 40 itself is activated in response to activation of V-ECU 30 for the leak check, because none of the IG (LIN) signal and IG (CAN) signal is received at time t2 (because the IG (LIN) signal and IG (CAN) signal are OFF) (NO in S104), and temporarily maintains actuator 45 in the state where the initial driving is completed, without proceeding to the P wall press control (NO in S108, S110).

As seen from above, in the present embodiment, when activation of P-ECU 40 is caused not by the IG ON manipulation but by an external factor (activated as V-ECU 30 is activated for the leak check), the P range confirmation process is unnecessary. Therefore, P-ECU 40 does not perform the P wall press control. As compared with the case where the P wall press control is performed each time P-ECU 40 is activated, the number of times the P wall press control is executed can be reduced and deterioration in durability of the components of shift switch mechanism 48 can be suppressed.

Further, when both of the IG (LIN) signal and IG (CAN) signal remain OFF until time t3 at which predetermined time T2 has elapsed, P-ECU 40 stops energization of actuator 45 at time t3 so as to return actuator 45 to the initial standby state (NO in S104, YES in S108, S112). In this way, energization of actuator 45 is prevented from being continued and thus the thermal durability of actuator 45 is improved.

Figure 9:
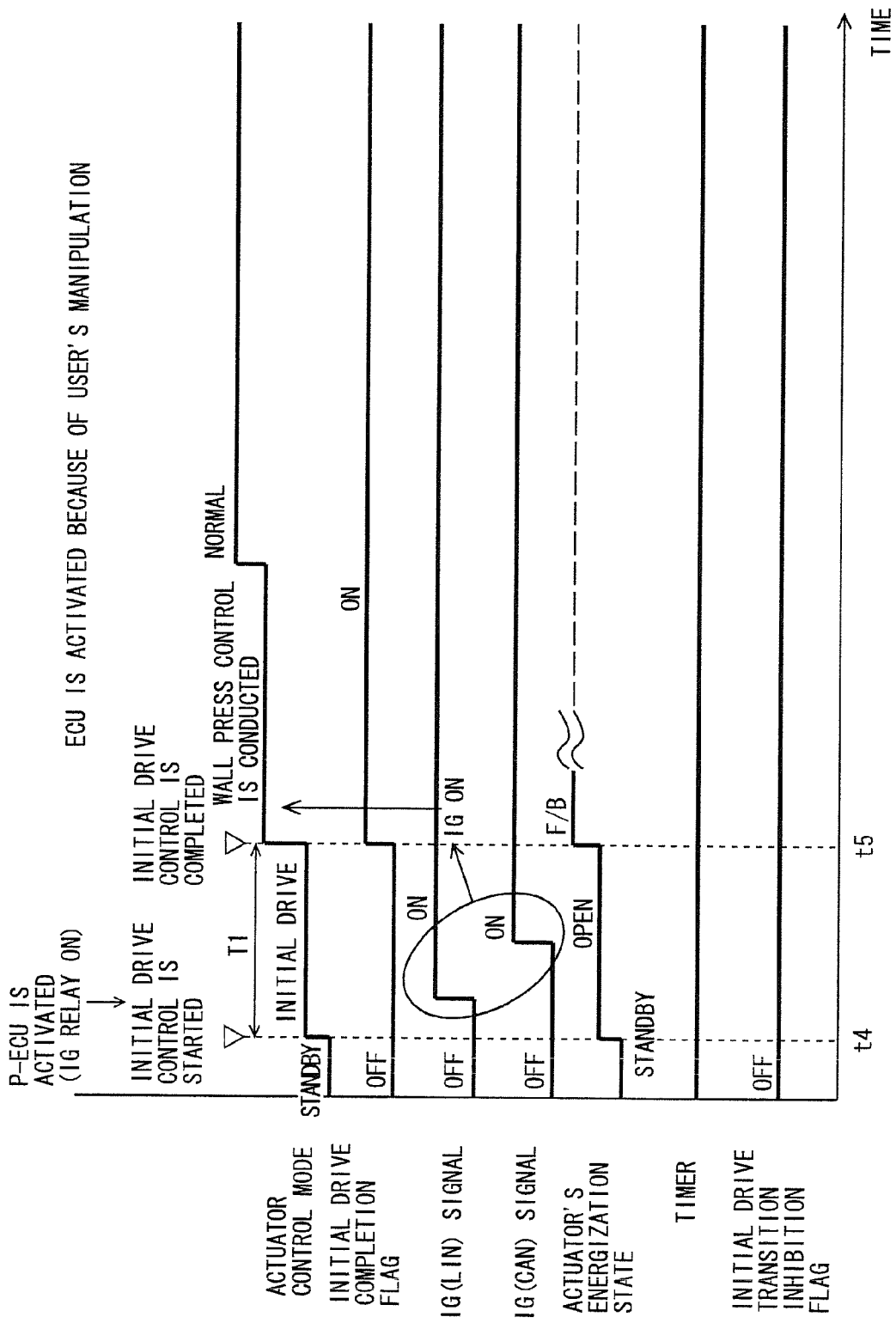
FIG. 9 is a (second) diagram illustrating a change with time of the actuator control mode in the case where P-ECU 40 is activated.

FIG. 9 shows a change with time of the actuator control mode in the case where the actuator is activated normally in response to the IG ON manipulation.

At time t4, in response to the IG ON manipulation by a user, PM-ECU 50 turns on IG relay 52. Then, a plurality of electrical devices including P-ECU 40 is activated. Once P-ECU 40 is activated, P-ECU 40 starts energization of actuator 45, and performs initial driving of actuator 45 until time t5 at which predetermined time T1 has elapsed.

As shown in FIG. 9, the IG (LIN) signal from PM-ECU 50 and the IG (CAN) signal from B-ECU 60 are received by P-ECU 40 at the time with a slight delay from time t4. P-ECU 40 of the present embodiment starts the initial driving from time t4, and determines at time t5 when the initial driving is completed whether or not the IG (LIN) signal and IG (CAN) signal are received (YES in S102, S104). Therefore, as compared with the case where the initial driving is started after it is determined that the IG signal is received, the initial driving can be started earlier.

Figure 10:
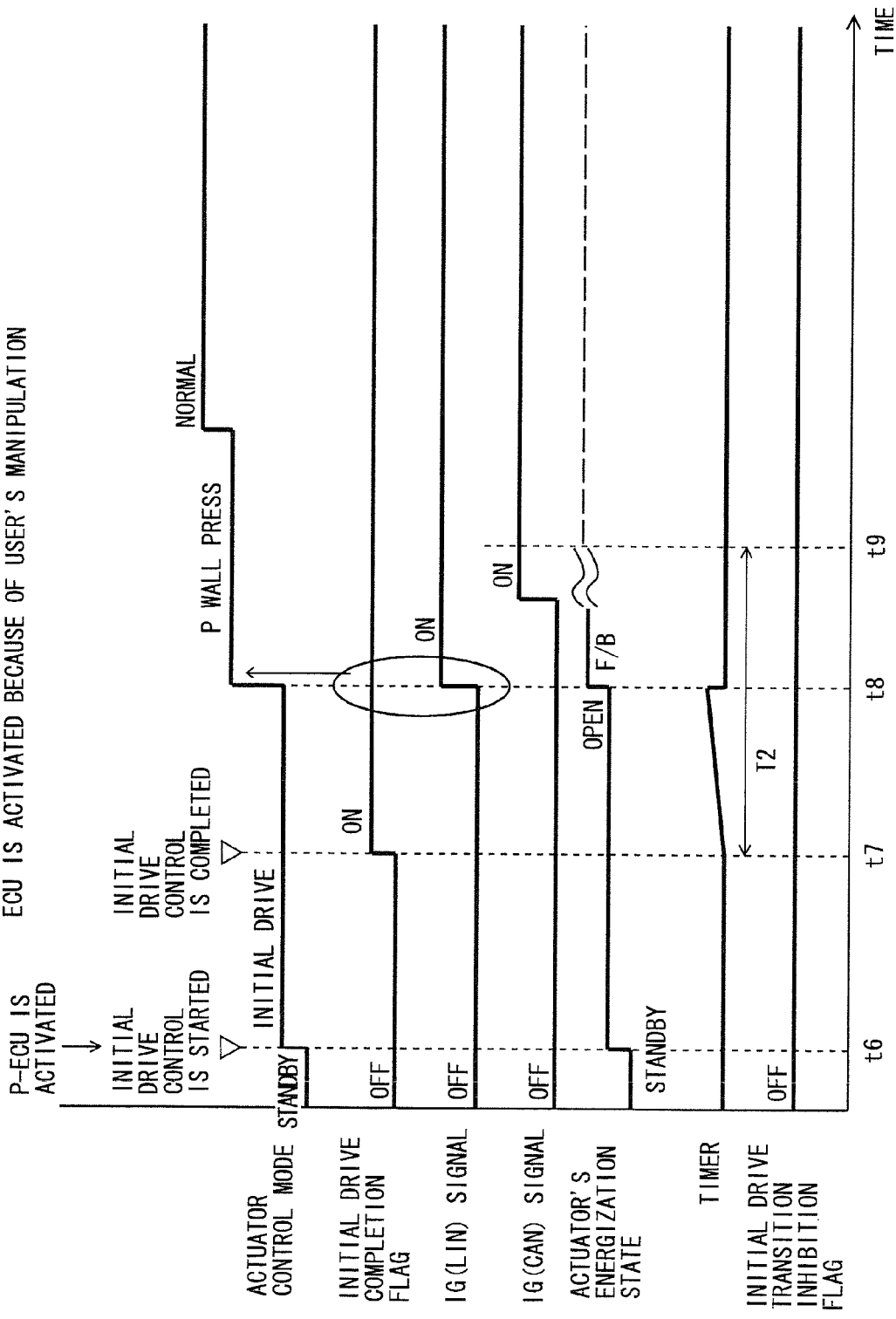
FIG. 10 is a (third) diagram illustrating a change with time of the actuator control mode in the case where P-ECU 40 is activated.

FIG. 10 also shows a change with time of the actuator control mode when the actuator is normally activated in response to the IG ON manipulation. It should be noted that FIG. 10 shows the change with time of the actuator control mode in the case where P-ECU 40 is activated at time t6, and the IG (CAN) signal is received at time t8 in the period from the completion of the initial driving to the time when predetermined time T2 has elapsed (from time t7 to time t9). Examples of the case where the IG (LIN) signal or IG (CAN) signal is received after the initial driving is completed may include the case where a delay occurs in processing time of the transmission source ECU (PM-ECU 50, B-ECU 60), or a delay occurs in CAN communication or LIN communication with the transmission source ECU, or the case where a user performs the IG ON manipulation while the leak check of a fuel tank is conducted.

In this case, the IG signal has not been received at time t7 when the initial driving is completed. As long as the IG signal is received before predetermined time T2 has elapsed (NO in S108), actuator 45 is temporarily kept in the state where the initial driving is completed (S110). Therefore, even if the IG (CAN) signal is received at later time t8 due to communication delay or the like, it is unnecessary to perform the initial driving again from time t8. When the IG (CAN) signal is received at time t8, the P wall press control can be started in the earlier stage.

As seen from above, the P-ECU of the present embodiment determines whether the P-ECU itself is activated in response to the IG ON manipulation or activated because of an external factor. When the P-ECU is activated in response to the IG ON manipulation, the P-ECU performs the P wall press control. When the P-ECU is activated because of the external factor, the P wall press control is not performed. Thus, as compared with the case where the P wall press control is performed each time P-ECU 40 is activated, the number of times the P wall press control is executed can be reduced, and deterioration in durability of the components of shift switch mechanism 48 can be suppressed.

Second Embodiment

A control apparatus of a second embodiment of the present invention will be hereinafter described. In the present embodiment, V-ECU 30 has additional capabilities as described below, as compared with the above-described first embodiment. Other structures, capabilities and processing are identical to those of the above-described first embodiment, and the detailed description will not be repeated here.

Figure 11:
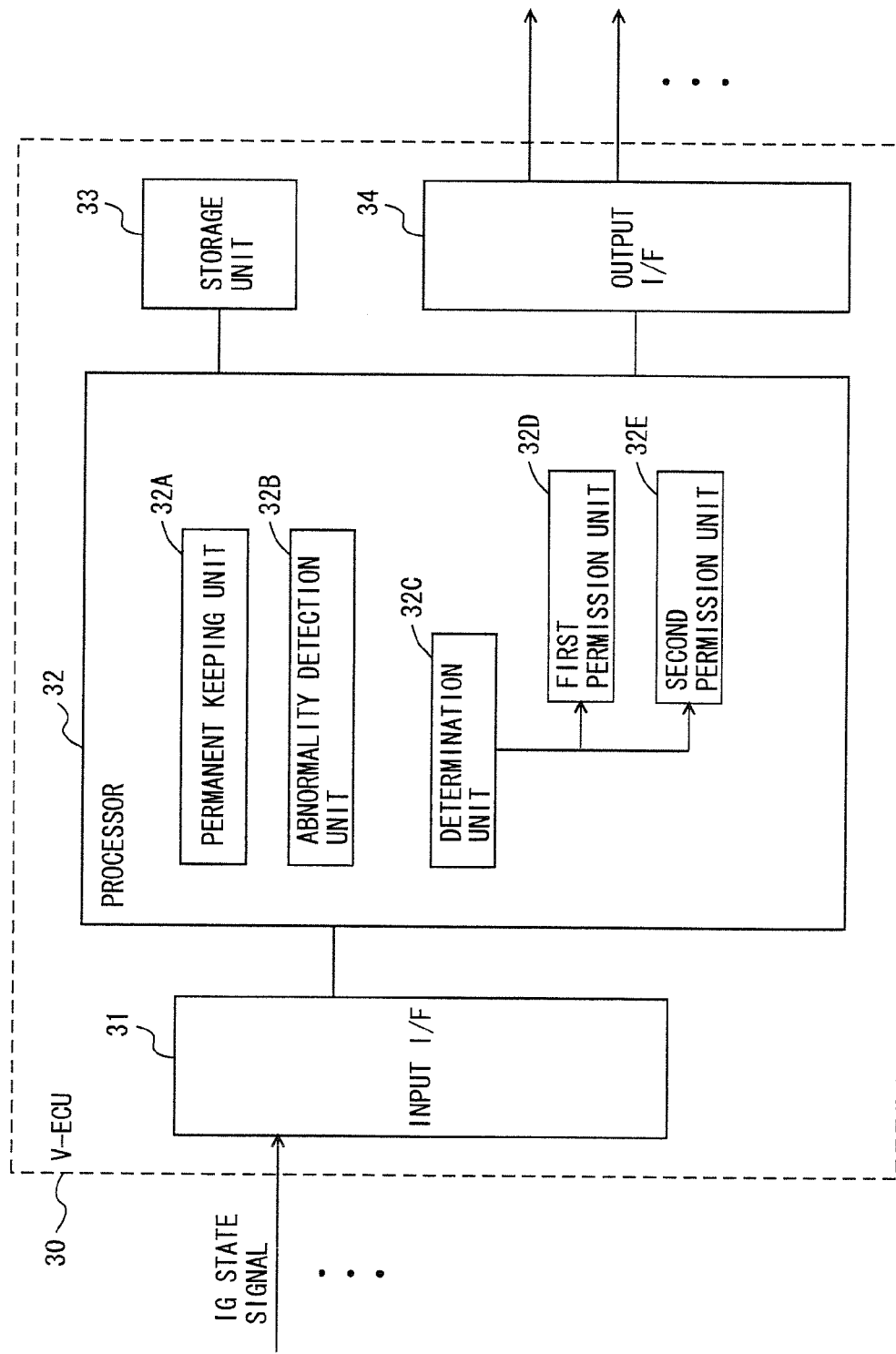
FIG. 11 is a functional block diagram of a V-ECU.

FIG. 11 shows a functional block diagram of V-ECU 30 of the present embodiment. V-ECU 30 includes an input interface 31, a processor 32, a storage unit 33, and an output interface 34.

To input interface 31, information is input from each sensor and each ECU.

Storage unit 33 stores various types of information, program, threshold, and map for example, and data in storage unit 33 is read into processor 32 or data from processor 32 is stored in storage unit 33, as required.

Processor 32 performs an operation based on information from input interface 31 and storage unit 33. The result of the operation by processor 32 is output to each device via output interface 34.

Processor 32 includes a permanent keeping unit 32A, an abnormality detection unit 32B, a determination unit 32C, a first permission unit 32D, and a second permission unit 32E.

Permanent keeping unit 32A has a permanent keeping capability for main relay 35. Specifically, when the IG relay is OFF and the shift range is the N range, permanent keeping unit 32A permanently keeps main relay 35. "Permanent keeping" herein means to keep main relay 35 ON all the time. Accordingly, V-ECU 30 and P-ECU 40 are kept activated. The permanent keeping capability may belong to PM-ECU 50.

Here, a reason why the permanent keeping of main relay 35 is necessary will be described. Vehicle 10 has a capability to switch the vehicle state to the IG relay off state when a user keeps pressing start switch 28 long while the vehicle is traveling in the IG relay on state. This is a fail-safe capability that allows the user to appropriately reduce the drive force when an abnormality occurs to the hybrid system. In order to avoid the situation where the P lock cannot be set (shift range cannot be switched to the P range) when the vehicle state is switched by the fail-safe capability to the IG relay off state, main relay 35 is permanently kept and P-ECU 40 for effecting the P lock is kept activated in the case of "IG OFF and N range". This is why the permanent keeping of main relay 35 is necessary. Main relay 35 may be permanently kept in the case of "IG OFF" and "non-P range".

Abnormality detection unit 32B has a capability to detect a response abnormality of P-ECU 40. Specifically, abnormality detection unit 32B transmits to P-ECU 40 a request to switch the shift range to the P range (or request to switch the shift range to the non-P range), and determines that a response abnormality of P-ECU 40 occurs when the abnormality detection unit does not receive a response from P-ECU 40 about the fact that the shift range is the P range.

P-ECU 40 does not perform the P wall press control when activation of P-ECU 40 is caused by an external factor. At this time, if V-ECU 30 permits execution of the permanent keeping capability for main relay 35 and the abnormality detection capability of V-ECU 30, a problem arises as follows.

First, when P-ECU 40 is activated because of an external factor, the vehicle is in the IG relay off state and P-ECU 40 does not perform the P wall press control (the shift range is not necessarily the P lock). Therefore, in the case where the shift range is the N range, the condition "IG OFF and N range" is satisfied. At this time, if the permanent keeping capability for main relay 35 is executed, main relay 35 cannot be made OFF regardless of the fact that P lock is unnecessary.

Second, when P-ECU 40 is activated because of an external factor, P-ECU 40 does not execute the P wall press control, and thus does not perform the P range confirmation process and the subsequent control of actuator 45. In such a state, even if V-ECU 30 transmits to P-ECU 40 a request to switch the shift range to the P range, P-ECU 40 cannot switch the shift range to the P range and cannot transmit to V-ECU 30 a response representing the fact that the shift range is the P range. Thus, although P-ECU 40 normally operates, it is erroneously determined that a response abnormality of P-ECU 40 occurs.

Thus, V-ECU 30 of the present embodiment does not perform the permanent keeping for main relay 35 and the abnormality detection of V-ECU 30, in the case where P-ECU 40 cannot perform the P wall press control since P-ECU 40 has been activated because of an external factor. This capability is implemented by determination unit 32C, first permission unit 32D and second permission unit 32E.

Determination unit 32C determines whether or not P-ECU 40 is activated because of an external factor. For example, when the current IG state signal is OFF, there is no IG ON history in the current trip and the latest activation of V-ECU 30 is caused by an external factor (activated for the leak check), determination unit 32C determines that P-ECU 40 is activated because of an external factor.

In the case where activation of P-ECU 40 is not caused by an external factor, first permission unit 32D permits execution of the permanent keeping capability for main relay 35 by permanent keeping unit 32A. Specifically, a permanent keeping mask flag is made "OFF". In contrast, in the case where activation of P-ECU 40 is caused by an external factor, first permission unit 32D inhibits execution of the permanent keeping capability for main relay 35 by permanent keep unit 32A. Specifically, the permanent keeping mask flag is made "ON".

In the case where activation of P-ECU 40 is not caused by an external factor, second permission unit 32E permits execution of the abnormality detection capability for P-ECU 40 by abnormality detection unit 32B. Specifically, an abnormality detection mask flag is made "OFF". In contrast, when activation of P-ECU 40 is caused by an external factor, second permission unit 32E inhibits execution of the abnormality detection capability for P-ECU 40 by abnormality detection unit 32B. Specifically, the abnormality detection mask flag is made "ON".

The capabilities as described above may be implemented by software or may be implemented by hardware.

Figure 12:
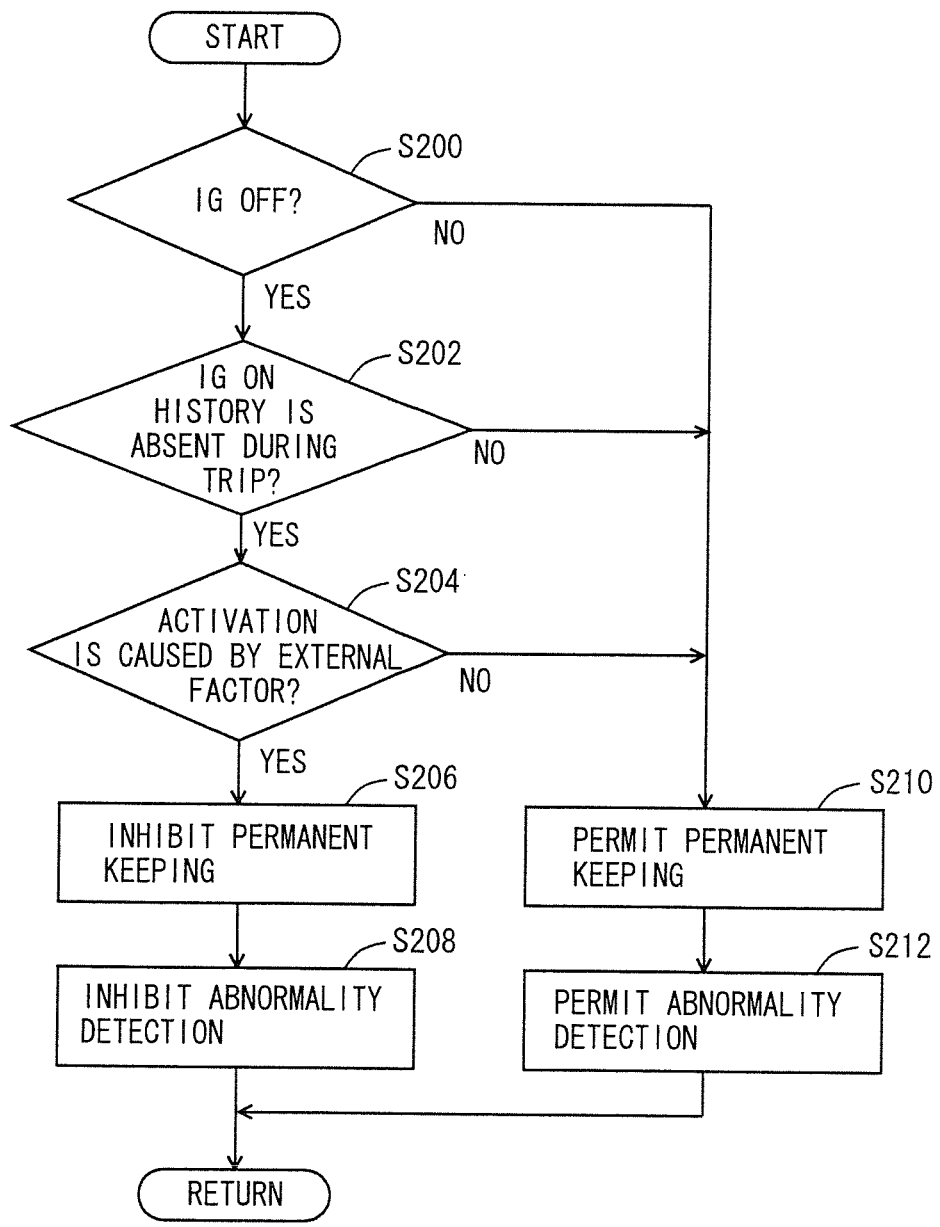
FIG. 12 is a process flowchart for the V-ECU.

FIG. 12 is a process flowchart for V-ECU 30 when above-described capabilities of determination unit 32C, first permission unit 32D and second permission unit 32E are implemented by software. The process is executed in predetermined cycles while the IG relay ON state is maintained.

In S200, V-ECU 30 determines whether the current IG state signal is OFF or not. When the determination is positive (YES in S200), the process proceeds to S202. Otherwise (NO in S200), the process proceeds to S210.

In S202, V-ECU 30 determines whether IG ON history is absent during the current trip. When the determination is positive (YES in S202), the process proceeds to S204. Otherwise (NO in S202), the process proceeds to S210.

In S204, V-ECU 30 determines whether or not the latest activation of V-ECU 30 is caused by an external factor (activation for the leak check). When the determination in this step is positive (YES in S204), the process proceeds to S206. Otherwise (NO in S204), the process proceeds to S210.

In S206, V-ECU 30 inhibits execution of the permanent keeping capability for main relay 35 as described above. Specifically, V-ECU 30 makes the permanent keeping mask flag "ON". The permanent keeping mask flag in its initial state is set to "OFF".

In S208, V-ECU 30 inhibits execution of the abnormality detection capability for P-ECU 40. Specifically, the abnormality detection mask flag is made "ON". The abnormality detection mask flag in its initial state is set to "OFF".

In S210, V-ECU 30 permits execution of the above-described permanent keeping capability. Specifically, V-ECU 30 makes the permanent keeping mask flag "OFF".

In S212, V-ECU 30 permits execution of the abnormality detection capability for P-ECU 40 as described above. Specifically, the abnormality detection mask flag is made "OFF".

An operation of V-ECU 30 of the present embodiment based on the above-described structure and flowchart will be described with reference to FIGS. 13 and 14. FIGS. 13 and 14 illustrate an operation of V-ECU 30 for setting the permanent keeping mask flag.

FIG. 13 illustrates the permanent keeping mask flag in the case where a user keeps pressing start switch 28 long while the vehicle is traveling. In FIG. 13, the case is shown where the IG relay is turned off at time t11 in response to the long pressing of start switch 28 (actually the accessory state (ACC state) is effected), and the shift range is the N range.

In this case, at time t11, the IG relay is turned off (YES in S200). Because of the presence of the IG ON history (NO in S202), the permanent keeping mask flag is "OFF" (S210). Therefore, as shown in FIG. 13, the permanent keeping capability is effected at time t11 and the permanent keeping request is made ON. Accordingly, P-ECU 40 is kept activated and the P lock can be set later as well.

In contrast, FIG. 14 illustrates the permanent keeping mask flag in the case where V-ECU 30 is activated for the leak check. As shown in FIG. 14, the IG relay is OFF when the leak check is conducted (YES in S200). Further, IG ON history is absent (NO in S202), and the latest activation of V-ECU 30 is caused by an external factor (YES in S204). The permanent keeping mask flag is thus made "ON" (S206). Accordingly, even when the condition "IG OFF and N range" is satisfied, the permanent keeping request for main relay 35 is not rendered ON. Therefore, such a case where main relay 35 cannot be turned off can be avoided and the electric power of power supply 54 can be prevented from being uselessly consumed.

As heretofore described, V-ECU 30 of the present embodiment performs the permanent keeping for main relay 35 under the condition "IG OFF and N range" in the case where activation of P-ECU 40 is caused by the IG ON manipulation. In this way, such a situation is avoided where the P lock cannot be set when the IG relay is switched to the off state by the fail-safe capability. In contrast, in the case where activation of P-ECU 40 is caused by an external factor, the permanent keeping for main relay 35 is not permitted even if the condition "IG OFF and N range" is satisfied. Accordingly, such a situation can be avoided where main relay 35 cannot be turned off in the case where P-ECU 40 is activated for the leak check, and thus electric power of power supply 54 can be prevented from being uselessly consumed.

Further, in the case where P-ECU 40 cannot execute the P wall press control due to the fact that activation of P-ECU 40 is caused by an external factor, P-ECU 40 cannot transmit to V-ECU 30 a response representing the fact that the shift range is the P range while P-ECU 40 is operating normally. Then, V-ECU 30 of the present embodiment does not perform abnormal detection in the case where P-ECU 40 cannot perform the P wall press control because activation of P-ECU 40 is caused by an external factor. Accordingly, P-ECU 40 is prevented from being erroneously regarded as abnormal by V-ECU 30, regardless of the fact that P-ECU 40 operates normally.

It should be construed that embodiments disclosed herein are by way of illustration in all respects, not by way of limitation. It is intended that the scope of the present invention is defined by claims, not by the above description of the embodiments, and includes all modifications and variations equivalent in meaning and scope to the claims.

REFERENCE SIGNS LIST 10 vehicle, 11 engine, 20 P switch, 22 indicator, 24 input unit, 26 shift switch, 28 start switch, 30 V-ECU, 31 input interface, 32 processor, 32A permanent keeping unit, 32B abnormality detection unit, 32C determination unit, 32D permission unit, 32E permission unit, 33 storage unit, 34 output interface, 35 main relay, 40 P-ECU, 41 input interface, 42 processor, 42A initial drive unit, 42B determination unit, 42C wall press control unit, 42D keeping control unit, 42E standby control unit, 43 storage unit, 44 output interface, 45 actuator, 46 encoder, 48 shift switch mechanism, 52 IG relay, 54 power supply, 70 drive mechanism, 80 CAN communication line, 90 LIN communication line, 100 detent plate, 102 shaft, 104 rod, 106 parking lock pole, 108 parking gear, 110 detent spring, 120 non-P range position, 122 crest, 124 P range position, 200 P wall, 210 non-P wall

The invention claimed is:

1. A control apparatus for a vehicle having a shift switch mechanism for switching a shift range of a transmission by driving an actuator, said shift switch mechanism including a rotational member coupled to said actuator, and a restriction member for restricting rotation in a predetermined direction of said rotational member by contacting a predetermined portion of said rotational member when a rotational position in said predetermined direction of said rotational member is caused to reach a reference position corresponding to a predetermined shift range by driving said actuator, said control apparatus comprising:
a first device for detecting that a user of said vehicle performs a start manipulation for starting said vehicle; and
a second device activated in response to detection of said start manipulation by said first device or in response to occurrence of a factor different from said start manipulation, for controlling driving of said actuator,
said second device determining, when said second device is activated, whether activation of said second device is caused by said start manipulation or said factor different from said start manipulation, said second device controlling said actuator so that press control is executed by rotating said rotational member in said predetermined direction to cause said predetermined portion of said rotational member to be pressed against said restriction member for detecting said reference position, when activation of said second device is caused by said start manipulation, and said second device controlling said actuator so that said press control is not executed, when activation of said second device is caused by said factor different from said start manipulation.

2. The control apparatus for a vehicle according to claim 1, wherein
said actuator is required to undergo predetermined initial driving before driven by said press control, and
said second device executes initial control for performing said initial driving when said second device is activated, and determines after said initial control is completed whether activation of said second device is caused by said start manipulation or said factor different from said start manipulation.

3. The control apparatus for a vehicle according to claim 2, said control apparatus further comprising a third device for transmitting to said second device start information that said start manipulation is detected by said first device, wherein
in a case where said second device receives said start information in a period from completion of said initial control to the time when a predetermined time has elapsed since completion of said initial control, said second device executes said press control based on a determination that activation of said second device is caused by said start manipulation and, in a case where said second device has not received said start information at the time when said predetermined time has elapsed since completion of said initial control, said second device does not execute said press control based on a determination that activation of said second device is caused by said factor different from said start manipulation.

4. The control apparatus for a vehicle according to claim 3, wherein
in a case where said second device has not received said start information at the time when said initial control is completed, said second device temporarily keeps said actuator in a state after said initial control,
in a case where said second device does not receive said start information in the period from completion of said initial control to the time when said predetermined time has elapsed since completion of said initial control, said second device continues temporarily keeping said actuator in said state after said initial control,
in a case where said second device receives said start information in the period from completion of said initial control to the time when said predetermined time has elapsed since completion of said initial control, said second device executes, when said second device receives said start information, said press control without executing again said initial control, and
in a case where said second device has not received said start information at the time when said predetermined time has elapsed since completion of said initial control, said second device returns said actuator to a state before said initial control.

5. The control apparatus for a vehicle according to claim 1, said control apparatus further comprising a fourth device for making an abnormality determination of whether an abnormality occurs to said second device, based on a result of said press control by said second device, wherein
said fourth device does not make said abnormality determination when said second device cannot execute said press control based on the fact that activation of said second device is caused by said factor different from said start manipulation.

6. The control apparatus for a vehicle according to claim 1, wherein
said vehicle includes a power supply for supplying electric power to said second device,
said second device executes said press control to set said shift range to a parking range,
said control apparatus further comprises a fourth device for controlling supply of electric power from said power supply to said second device, and
in a case where said second device executes said press control based on the fact that activation of said second device is caused by said start manipulation, said fourth device inhibits stoppage of supply of electric power from said power supply to said second device when a predetermined condition including a condition that said shift range is a range different from said parking range is satisfied and, in a case where said second device cannot execute said press control based on the fact that activation of said second device is caused by said factor different from said start manipulation, said fourth device permits stoppage of supply of electric power from said power supply to said second device even when said predetermined condition is satisfied.

7. The control apparatus for a vehicle according to claim 1, wherein
said vehicle is driven by at least an internal combustion engine, and
said factor different from said start manipulation includes necessity to diagnose an abnormality concerning said internal combustion engine while said second device is not activated.

8. A control method for a vehicle having a shift switch mechanism for switching a shift range of a transmission by driving an actuator, said shift switch mechanism including a rotational member coupled to said actuator, and a restriction member for restricting rotation in a predetermined direction of said rotational member by contacting a predetermined portion of said rotational member when a rotational position in said predetermined direction of said rotational member is caused to reach a reference position corresponding to a predetermined shift range by driving said actuator, and said vehicle including a first device for detecting that a user of said vehicle performs a start manipulation for starting said vehicle, and a second device activated in response to detection of said start manipulation by said first device or in response to occurrence of a factor different from said start manipulation, for controlling driving of said actuator, said control method performed by said second device comprising the steps of:

determining, when said second device is activated, whether activation of said second device is caused by said start manipulation or said factor different from said start manipulation;

controlling said actuator so that press control is executed by causing said predetermined portion of said rotational member to be pressed against said restriction member for detecting said reference position, when activation of said second device is caused by said start manipulation; and controlling said actuator so that said press control is not executed, when activation of said second device is caused by said factor different from said start manipulation.

* * * * *